(12) United States Patent
Gupta

(10) Patent No.: US 12,014,352 B1
(45) Date of Patent: Jun. 18, 2024

(54) CARD-TO-CARD DIRECT COMMUNICATION WITH NON-FUNGIBLE TOKEN (NFT) STACKING AND BARTER

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/219,126

(22) Filed: Jul. 7, 2023

(51) Int. Cl.
*G06Q 20/34* (2012.01)
*G06K 19/07* (2006.01)
*G06K 19/077* (2006.01)
*G06Q 20/38* (2012.01)
*G06Q 20/40* (2012.01)

(52) U.S. Cl.
CPC ....... *G06Q 20/352* (2013.01); *G06K 19/0723* (2013.01); *G06K 19/07707* (2013.01); *G06Q 20/382* (2013.01); *G06Q 20/409* (2013.01)

(58) Field of Classification Search
CPC .............. G06Q 20/352; G06Q 20/382; G06K 19/0723; G06K 19/07707
USPC ........................................................ 235/380
See application file for complete search history.

(56) References Cited

U.S. PATENT DOCUMENTS

| | | | |
|---|---|---|---|
| 7,128,274 B2 | 10/2006 | Kelley et al. | |
| 8,256,667 B2 | 9/2012 | Poznansky et al. | |
| 8,880,028 B2 | 11/2014 | Han | |
| 9,864,944 B2 | 1/2018 | Radu et al. | |
| 10,621,574 B1 | 4/2020 | Rao | |
| 11,010,752 B1* | 5/2021 | Gupta | G06Q 20/4012 |
| 11,176,540 B2* | 11/2021 | Gupta | G06Q 20/352 |
| 11,956,363 B2* | 4/2024 | Venezia | H04L 9/3297 |
| 2019/0286805 A1 | 9/2019 | Law et al. | |
| 2020/0034830 A1 | 1/2020 | Ortiz et al. | |
| 2022/0164899 A1* | 5/2022 | Brown | G06K 19/06037 |

(Continued)

OTHER PUBLICATIONS

Scott Thornton, "NFC Basics: How to Use for Programming Automation," https://www.microcontrollertips.com/programming-automation-using-nfc-tags-faq/, May 31, 2018.

(Continued)

*Primary Examiner* — Ahshik Kim
(74) *Attorney, Agent, or Firm* — Weiss & Arons LLP

(57) ABSTRACT

Apparatus and methods are provided for a smart card which enables users to securely complete online transfers without entering sensitive transaction information into a third-party system. The smart card may include a touch-sensitive screen configured to display selectable transfer options. The smart card may include a microprocessor and wireless interface. The wireless interface may provide wireless communication capabilities and the ability to initiate online transfers based on information captured by the touch-sensitive screen. A card issuer may mint an NFT with data from a past transaction using the smart card. The smart card may display the NFT and an associated score on the touch-sensitive screen. The smart card may communicate with another smart card using near-field communication to share NFT and score data. The smart card may accept or decline a transaction based on one or more NFTs associated with the other card.

24 Claims, 8 Drawing Sheets

(56) References Cited

U.S. PATENT DOCUMENTS

2023/0144857 A1* 5/2023 Khan .................... H04L 9/3247
                                                      713/168

OTHER PUBLICATIONS

"Contactless Smart Card," https://en.wikipedia.org/wiki/Contactless_smart_card, Wikimedia Foundation, Inc., Dec. 22, 2019.
Robert Triggs, "What is NFC and Does it Work," https://www.androidauthority.com/what-is-nfc-270730/, Android Authority, Retrieved on Jan. 27, 2020.
"How Does NFC Work," https://www.bluebite.com/nfc/how-does-nfc-work, Blue Bite LLC, Oct. 15, 2019.
Adithya Venkatesan, "How Things Work: NFC Can Be Active or Passive," https://thetartan.org/2014/9/15/scitech/howthingswork, The Tartan Carnegie Mellon's Student Newspaper, Sep. 14, 2014.
Near Field Communication (NFC), https://www.geeksforgeeks.org/near-field-communication-nfc/, Geeks For Geeks, Retrieved on Jan. 27, 2020.
"Near-Field Communication," https://en.wikipedia.org/wiki/Near-Field_communication, Wikimedia Foundation, Inc., Jan. 20, 2020.
"Stored-Value Card," https://en.wikipedia.org/wiki/Stored-value_card, Wikimedia Foundation, Inc., Jan. 25, 2020.
Nathan Chandler, "What's an NFC Tag?" https://electronics.howstuffworks.com/nfc-tag 1.htm, HowStuffWorks, a division of InfoSpace Holdings LLC, Retrieved on Jan. 27, 2020.

* cited by examiner

CARD-TO-CARD DIRECT COMMUNICATION WITH NON-FUNGIBLE TOKEN (NFT) STACKING AND BARTER

FIELD OF TECHNOLOGY

Aspects of the disclosure relate to a smart payment card with enhanced communication features.

BACKGROUND OF THE DISCLOSURE

When conducting online transactions and payments, users typically enter credit card information or other sensitive transaction information into a web browser or mobile application. However, doing so increases a risk that the sensitive transaction information will be exposed. For example, security associated with the web browser may be substandard or the security of another network system utilized by a mobile application may be compromised. These potential security flaws associated with third-party systems that transmit and capture sensitive transaction information may increase the exposure risk.

In addition to security breaches of even reputable third-party systems, there are unscrupulous actors who design systems which attempt to induce users to enter sensitive transaction information into legitimate-looking webpages. These rogue systems are typically designed to masquerade as a reputable system or webpage, and thereby induce the user to enter sensitive transaction information. The system may then expose the captured sensitive transaction information for self-serving pecuniary gain.

Recently, use of digital wallets has proliferated. These digital wallets are typically associated with more reliable security than prior systems. However, even use of a digital wallet does not fully address the challenges in securing sensitive transaction information. For example, when using digital wallets, sensitive transaction information may still be captured using third-party applications that may track use and content of the sensitive transaction information. By increasing the number of parties that handle the sensitive transaction information, there is an associated increase in risk that the sensitive transaction information will be inadvertently disclosed.

It would be desirable to provide more secure apparatus and methods for users to carry out online transactions without providing sensitive transaction information to any third-party system.

In addition to reducing the exposure risk of sensitive transaction information, such apparatus and methods may improve user experience by enabling direct transactions between card users. It would be desirable to enable a card user to receive communications regarding another smart card. It would be desirable to enable a transfer of funds directly from the user card, without providing sensitive transaction information to any third-party system.

SUMMARY OF THE DISCLOSURE

A smart payment card may enable direct online transfers and improve the security of sensitive transaction information. The smart card may include a housing. A wireless communication interface, a microprocessor, and a battery for powering the communication interface may be embedded in the housing. The smart card may include a touch-sensitive screen that captures finger motions.

The smart card may include executable instructions stored in a non-transitory memory. The executable instructions, when run by the microprocessor may display a selectable transfer option using the touch-sensitive screen. The executable instructions may capture a touch-based selection of the transfer option using the touch-sensitive screen, and based on the captured selection, formulate a set of transfer instructions.

The executable instructions may, using the wireless interface, establish a direct communication channel with a secure payment gateway identified in the transfer instructions and transmit the transfer instructions directly to the secure payment gateway for processing.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
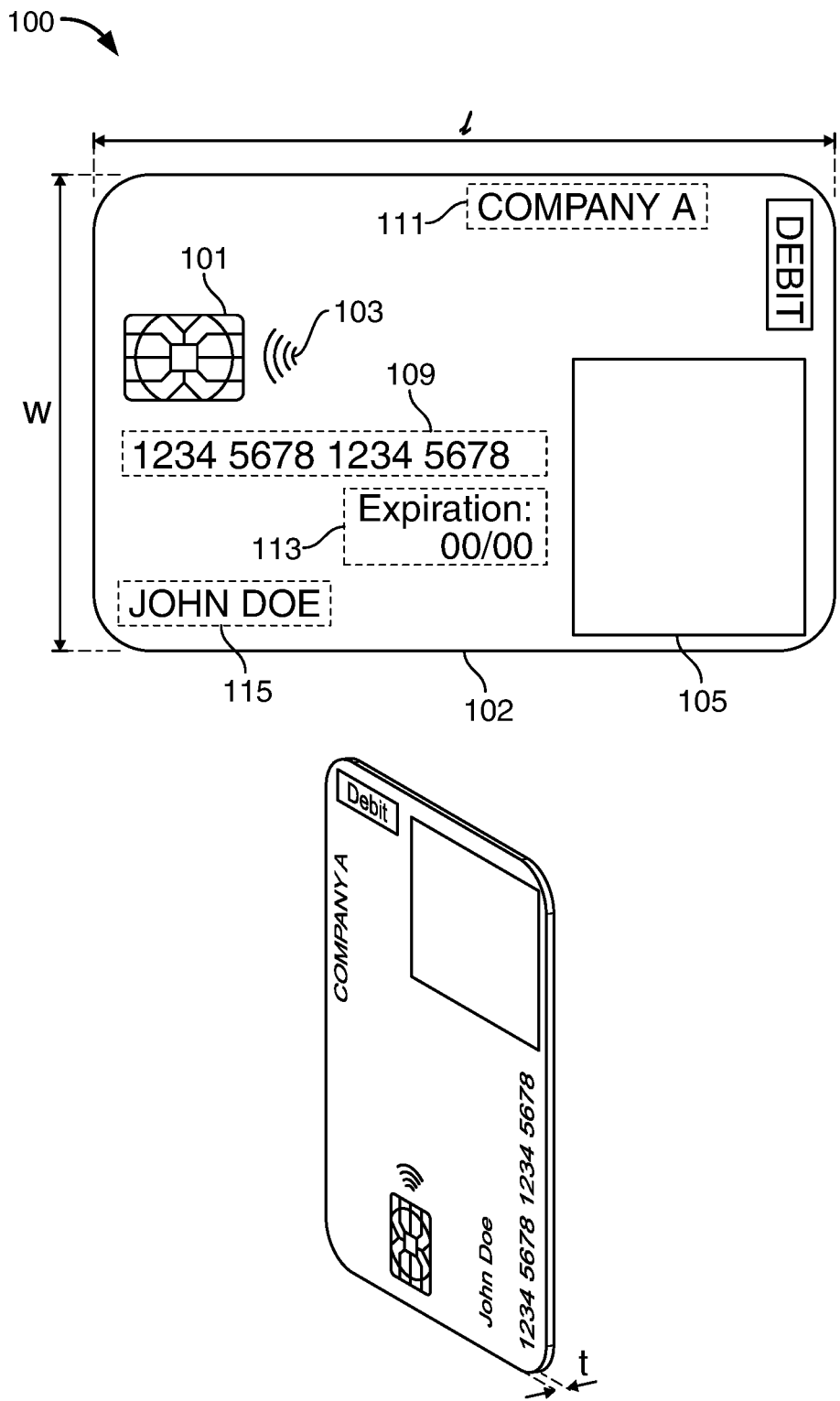
FIG. 1 shows illustrative apparatus in accordance with principles of the disclosure.

Systems, methods, and apparatus are provided for improving transmission security for direct transfers between smart payment cards.

A smart card may be a payment (e.g., debit or credit) card that includes embedded integrated circuitry. The integrated circuitry may be configured to store sensitive transaction information. The integrated circuitry may also be configured to execute machine readable instructions that control operation of other components of the smart card.

The smart card may include hardware and associated integrated circuitry for users to complete online transfers without entering sensitive transaction information into a third-party system such as a web browser or other software applications. The smart card may include a touch-sensitive screen. The smart card may include a virtual keypad. The user may use the touch-sensitive screen to enter information directly into the smart card. In some embodiments, the smart card may include a mechanical keyboard.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory. The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with another smart card, perform power management routines, or perform other suitable tasks.

The smart card may include non-transitory memory locations within the housing. The microprocessor may access such memory locations. The non-transitory memory locations may be included in the microprocessor. The non-transitory memory locations may store software, that when executed by the microprocessor, cause the smart card to perform various functions. For example, the microprocessor may instruct a communication interface to transmit an NFT to another smart card using near field communication (NFC).

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, a touch-sensitive screen or a communication interface of the smart card.

In some embodiments, the smart card may be activated in response to receiving high frequency wireless signals. The high frequency signals may be detected by the communication interface. The high frequency signals may be broadcast by another smart card. The high frequency signals may be generated by a near field communication ("NFC") reader. In some embodiments, in response to receiving the power, the microprocessor may be activated and begin to draw power from a battery on the smart card.

The smart card may operate in a networked environment. The smart card may support establishing communication channels with one or more financial institutions. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other for establishing communications over a WAN, such as the Internet. The communication interface may include the modem. It will be appreciated that the network connections shown are illustrative and other means of establishing a communications link between devices may be used. The existence of any of various well-known protocols such as TCP/IP, Ethernet, FTP, HTTP, and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones multiprocessor systems, microcomputers, distributed minicomputers, mainframe computers, computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to the communication interface and the microprocessor. The battery may have a thickness that is not greater than 0.5 mm. The battery may be rechargeable. The battery may be recharged via any suitable method. Illustrative charging methods include solar charging, wireless inductive charging, and connection via a charging port.

The smart card may include a communication interface. The communication interface may have a thickness that is not greater than 0.8 mm. The communication interface may be configured to implement protocols for wireless communication. The communication interface may include one or more antennae for transmitting and receiving wireless signals.

The communication interface may include communication circuitry. The communication circuitry may include software and/or hardware for establishing a wireless communication channel with a financial institution. The financial institution may be the card issuer. The communication interface may be compatible with illustrative wireless channels such as Wi-Fi, Bluetooth, Ethernet, NFC, satellite and cellular telecommunications. Wi-Fi may include passive Wi-Fi with lower power consumption than typical Wi-Fi.

The communication interface may include an active near field communication ("NFC") reader. The NFC reader may be an NFC chip. The NFC reader may communicate over a typical NFC range (~2 in.) when transmitting or sensitive receiving data. An illustrative NFC reader may utilize a 13.56 MHz radio frequency. Illustrative NFC protocols include European Computer Manufacturers Association Document Nos. 340 and 352 and International Organization for Standardization Document Nos. 18092 and 21481. All these standards are hereby incorporated by reference herein in their entireties.

The communication interface may include a network interface card ("NIC"). The microprocessor and associated NIC may enable the smart card to establish a secure internet-based communication channel for the smart card to interact directly with a secure system for transferring funds. The secure system may be operated by an issuer or acquirer of the smart card.

In some embodiments, the smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM.

For example, the user may use the smart card to access an ATM and withdraw cash. The user may also use the smart card to make a purchase at a traditional brick and mortar merchant location. The user may pay for such a purchase using a conventional point-of-sale ("POS") terminal at the brick and mortar location. When the smart card is inserted into a card reader of an ATM or POS terminal a battery of the smart card may be recharged.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in and protected by the housing. The smart card may include a touch-sensitive screen on an outside surface of the housing.

The housing may have a thickness that is not greater than 0.8 millimeters ("mm") and a surface area that is not greater than 86 mm×54 mm. Such a compact form factor may allow the smart card to be inserted into traditional card readers and function as a typical debit or credit card.

In some embodiments, the smart card may include a mechanical keypad. The keypad may be mounted on an outside surface of the housing. The keypad may include mechanical keys. The keypad may be mounted on an outside of the housing. The housing of the smart card may conform to the predefined form factor. The keypad may not increase the form factor of the smart card defined by the ATM for receiving the smart card. For example, the housing and the keypad mounted on an outside of the housing may collectively have a thickness that is not greater than 0.8 mm. An entire surface area of the smart card, including the keypad, may not exceed 86 mm×54 mm.

In some embodiments, the smart card may include a touch-sensitive screen. The touch-sensitive screen may capture finger motions. The finger motions may include transfer information entered by a user of the smart card. The microprocessor may capture the finger motions entered using the touch-sensitive screen.

The smart card may include specialized software (executable by the microprocessor) for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify user touch based on detecting an electrical disturbance created when the user touches the screen. The human body is an electronic conductor and contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection, or acoustic pulse recognition technologies.

The smart card may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. For example, the touch-sensitive screen may display a list of payment options and the user may select one or the option by using a finger to touch the desired option. Single-touch functionality may also recognize double finger taps or a long-press functionality. Multi-touch functionality may detect input from two or more simultaneous user touch points on the touch-sensitive screen. For example, a pinch-to-zoom feature is a multi-touch functionality.

The touch-sensitive screen may include nano-thin light emitting diode ("LED") technology.

The touch-sensitive screen may include organic light emitting diode ("OLED") technology. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The touch-sensitive screen may have a thickness that is not greater than 0.25 mm. The touch-sensitive screen may be flexible. The touch-sensitive screen may cover any suitable portion of a card surface. The touch-sensitive screen may cover an entire card surface.

The smart card may include a haptic response system. The haptic response may system provide a responsive force, vibration or movement in response to receiving a user's touch input. For example, the haptic response system may provide a responsive vibration to a user's touch-based selection of a transfer option. The haptic response system may include an eccentric (unbalanced) rotating mass, a linear resonant actuator, a piezoelectric actuator or any other suitable hardware for providing a haptic response.

The microprocessor and associated hardware may interpret finger motions of the user applied to the touch-sensitive screen. For example, the microprocessor may translate the user's finger motions into digital transfer information. The microprocessor may translate the user's finger motions digital transfer instructions. The microprocessor may encrypt the captured finger motions.

The microprocessor may formulate a set of transfer instructions based on the captured finger motions. The microprocessor may formulate a set of transfer instructions based on a user's touch-based selection of a transfer option displayed on the touch-sensitive screen. The user may provide touch-based confirmation of the accuracy of a transfer instruction formulated by the microprocessor.

Illustrative finger motions entered using the touch-sensitive screen and encrypted by the microprocessor may include a personal identification number ("PIN") associated with the smart card, acceptance of displayed NFTs and credit scores, and entry of a transfer amount.

The touch-sensitive screen may have an inactive state. In the inactive state, the touch-sensitive screen may be unable to capture data such as a user's touch inputs. When the touch-sensitive screen is in the inactive state, touch inputs including finger motions applied to the touch-sensitive screen may not be captured by the microprocessor.

The touch-sensitive screen may have an active state. In the active state, the touch-sensitive screen may be capable of capturing data, such as a user's touch inputs. The inactive state may be a default state of the touch-sensitive screen. A default inactive state may avoid the microprocessor capturing inadvertent touch inputs.

The microprocessor may toggle the touch-sensitive screen from the inactive state to the active state. The microprocessor may toggle the touch-sensitive screen from the active state to the inactive state.

The touch-sensitive screen may be configured to display a virtual keypad. The virtual keypad may include a display of input buttons that may be touch-selected by the user. The housing and the touch-sensitive screen collectively may have a thickness that is not greater than. 8 mm.

The smart card may include executable instructions stored in a non-transitory memory. The executable instructions, when run by the microprocessor may receive an input from a user. For example, the input may include a user's touch-based selection of a transfer option displayed on a touch-sensitive screen. The input may include a transfer amount entered into a virtual keypad. The executable instructions may formulate a set of sensitive transfer instructions based on the input.

The formulated sensitive transfer instructions may incorporate sensitive transaction information stored on the smart card. Sensitive transaction information, as used herein, may include:
   Primary Account Number ("PAN")
   User name
   Address
   Telephone number
   Expiration date
   Service code
   Authentication data
   Personal Identification Number ("PIN")
   PIN Block
   Card validation value (CVV), or any other three/four-digit card security code The PAN is a typically multi-digit number printed on a front face of the smart card. The PAN may identify an issuer bank associated with the smart card. The smart card may correlate the specified issuer to the network address of a secure payment gateway. The PAN may identify a user account at the issuer bank.

A PIN associated with the smart card may be a secret numeric password known only to the user of the smart card. The PIN may be used to authenticate the user before providing access to a secure payment processing system. A user may only be granted access to the secure system if the PIN provided matches a PIN stored on the secure system. For example, a PIN may be used to authenticate the smart card at an ATM. A PIN may also be used to authorize a digital signature implemented by an EMV chip.

A PIN Block includes data used to encapsulate a PIN during processing and transmission of the PIN. The PIN block defines the location of the PIN within the PIN block and how it can be extracted from the PIN block. A typical PIN block includes the PIN, the PIN length, and may contain a subset of the PAN.

A service code may be a multidigit number. For example, in a three-digit service code, the first digit may indicate specific interchange rules that apply to the smart card. The second digit may specify authorization processing that is applied to the smart card when initiating a transaction. Illustrative authorization processing may include requiring submission of a PIN, biometric feature, signature, or a combination thereof. The second digit may also identify a secure payment gateway that is authorized to process transfer instructions formulated by the smart card.

The third digit may specify a range of services that are authorized in connection with use of the smart card. For example, the third digit may indicate whether the smart card may be used at an ATM to withdraw cash or only to purchase goods or services from a merchant.

A first smart card may initiate a transaction with another smart card. The system may perform a card-to-card direct contactless fund transfer between a first smart card and a second smart card.

The first smart card may be associated with a first account and the second smart card may be associated with a second account. The first smart card and the second smart card may be issued by the same card issuer or by different card issuers. The first account and the second account may be associated with the same financial institution or different financial institutions.

In some embodiments, the first smart card may initiate a transaction with the second smart card. The transaction may be a contactless transaction using NFC. Both the first smart card and the second smart card may function as an active NFC device using an embedded NFC reader. Both the first smart card and the second smart card may also function as a passive NFC device using an NFC tag. The NFC tag may include an antenna. The NFC tag may include a card identifier. The card identifier may include non-sensitive information. The NFC tag may be a re-writable tag.

When both the first smart card and the second smart card function as active NFC devices they may communicate in a peer-to-peer ("P2P") mode. The P2P mode may be a two-way communication. In P2P mode, the second smart card may function as a passive NFC device when transferring a card identifier and the first smart card as an active NFC device when receiving and processing the card identifier.

In accordance with principles of the disclosure, a user of the first smart card may position the first smart card within 4 inches of the second smart card. The NFC reader embedded in the first smart card may be activated by proximity to the second smart card. The first smart card user may input a transfer amount using the touch-sensitive screen or a manual keypad on the surface of the first smart card. The two smart cards may perform a handshake. The handshake may enable each card to acknowledge and authenticate the other card. Once authenticated, the first smart card may communicate directly with a secure payment network in order to complete the transaction.

The first smart card may receive input of a transaction amount from a user. The first smart card may read a card identifier from the second smart card using NFC. The first smart card may confirm the card identifier received from the second smart card. The card identifier may include non-sensitive identifying data, such as a cardholder name and address.

The first smart card may confirm the validity of the card identifier received from the second smart card. In some embodiments, the first smart card may compare the card identifier to known identifiers stored on the first smart card. In some embodiments, the first smart card may communicate with a payment network to confirm the card identifier. In some embodiments, the first smart card may display the card identifier to a user on the touch-sensitive screen. The user may manually verify the displayed card identifier data and input the confirmation to the first smart card.

After the first smart card has authenticated the second smart card, the second smart card may authenticate the first smart card. In some embodiments, the two authentications may occur concurrently. The two-sided confirmation may be considered a "handshake," i.e., an automated process of negotiation between the two communicating smart cards through the exchange of information that establishes the protocols of a communication link at the start of the communication.

In some embodiments, the first smart card and the second smart card may display a measure of credit strength. The measure of credit strength may be based on one or more past transactions.

The measure of credit strength may include transaction data associated with a past transaction. A smart card may communicate with a financial institution using the NIC. The financial institution may be the card issuer. The smart card may request past transaction information. The card issuer may mint the transaction information as an NFT. The NFT may include transaction information from the most recent transaction associated with the card. The transaction information may include transaction parties, transaction amount, authorization history, or any other suitable data. The card issuer may transmit the NFT to the smart card. Transmitting the transaction data as an NFT protects the data from tampering and from misappropriation.

The card issuer may also transmit a score to the smart card. The score may be associated with the NFT. In some embodiments, the score may be included in the NFT or in NFT metadata. The score may be a measure of the strength of the credit associated with a card user. The score may be a credit score. The score may be determined by a financial institution, by a government agency, by a third-party credit bureau or credit-rating agency, or by any suitable party. The score may be calculated using any suitable algorithm. The score may be associated with a single transaction. The score may be associated with multiple transactions. The score may be a combined score that has been updated to include the most recent transaction. The combined score may be a cumulative score. The combined score may be an average score.

The first smart card may display a representation of the NFT and an associated score on the touch-sensitive screen. The first smart card may transmit the NFT to the second smart card. In some embodiments, a smart card may transmit a representation of the NFT along with an associated score in place of the token itself. In some embodiments, a smart card may transmit NFT metadata or other data associated with the NFT or with the score.

When the first smart card and the second smart card are placed in proximity to each other they may exchange NFT and/or score data using NFC. A card display may show a number of retrieved NFTs and an associated score.

A smart card user may input confirmation that the NFT and score are sufficient. The input may be captured by the touch-sensitive screen. The confirmation may be shared with the other smart card using NFC.

In some cases, one NFT may not be deemed sufficient. A card user may request an additional NFT associated with another past transaction executed using the card. The transaction may be the next-most-previous transaction. A score may be provided for the additional NFT. In some embodiments, the scores for multiple NFTs may be added, averaged, or combined in any suitable manner. A card user may continue to request additional NFTs until satisfied.

In some embodiments, when the NFT is not deemed sufficient, a user may stack multiple smart cards. Each card may have received an NFT that is associated with credit score. The multiple smart cards may communicate with the second smart card or the first smart card using NFC. A number of NFTs and one or more scores may be displayed on the touch-sensitive screen of the first smart card and/or the second smart card. In some embodiments, the data may be displayed on the top smart card in the stack of smart cards.

The user of the first smart card may choose whether to transfer funds to a second smart card based on the display of NFTs and scores. The user may input acceptance of the transaction with the second card using the touch-sensitive screen or keypad. In response to the acceptance, transaction instructions may be transmitted from the first payment card directly to a secure gateway for the payment processing network.

The user may decline the transaction with the second smart card using the touch-sensitive screen or keypad. The declined status may be displayed on the touch-sensitive screen of the first smart card. The declined status may be communicated to the second smart card using NFC.

In some embodiments the smart card may be configured to automatically accept a transaction after a threshold number of NFTs or a threshold score is received. The threshold may be configured using the smart card touch-sensitive screen. The threshold may be configured at a mobile device application associated with the smart card, at a banking channel portal, or using any suitable method.

In some embodiments, the first smart card may request a trust deficit NFT from the second smart card. The trust deficit NFT may be associated with a failed transaction. The first smart card may analyze information from the trust deficit NFT to determine whether to proceed with the transaction.

The NFTs received from the card issuer may be maintained on the smart card in temporary storage. Upon completion of the transaction the smart card may erase or purge the NFTs from storage. The first smart card may retain a record of the number of NFTs and the scores in association with an identifier for the second smart card. In subsequent transactions with the second smart card, the first smart card may retrieve the stored NFT data in place of requiring a new NFT.

In some embodiments, the first smart card may receive a communication regarding the second smart card. The communication may be a transaction request. The communication may be request for a transfer of funds. The communication may be transmitted by the issuer of the first smart card, the issuer of the second smart card or by any suitable party.

In some embodiments, the first smart card may be automatically registered to receive communications in response to a previous transfer to the second smart card using the first smart card. In some embodiments, the user may register the first smart card with an issuer bank of the first smart card or the second smart card. The communication may be pushed to the first smart card.

The first smart card may display any part of the communication on the touch-sensitive screen. The first smart card may display one or more selectable transfer options on the touch-sensitive screen. The selectable options may include text, icons, or any suitable graphical representations. For example, the first smart card may display one or more preset transfer amount options such as "transfer $100 to John." In some embodiments, the first smart card may display a sliding bar for adjusting the amount of the transfer. In some embodiments, the first smart card may display a virtual keypad to enter an amount for a transfer. The first smart card may prompt entry of a PIN or other suitable authorization before displaying the communication or the selectable transfer options.

In some embodiments a selectable transfer option may include a predetermined name or abbreviation associated with the second smart card. In some embodiments the names or abbreviations may be customized by the user. The customizing may be executed using the smart card touch-sensitive screen. The customizing may be executed using a mobile device application associated with the smart card, using a banking channel portal or using any suitable method.

The first smart card may capture a user's touch-based selection of a transfer option displayed on the touch-sensitive screen. A payment controller on the first smart card may identify a recipient and an amount of a transfer based on the captured input. The first smart card may formulate transfer instructions based on the input. The first smart card may encrypt the transfer instructions.

Using the NIC, the first smart card may establish a direct communication channel with a secure payment gateway. A network address of the secure payment gateway may be identified in the transfer instructions. Only the secure payment gateway may be capable of decrypting the transfer instructions.

The secure payment gateway may be operated by an issuer or an acquirer bank. The secure payment gateway may credit the dependent account for the amount of the transfer. The secure payment gateway may debit the parent account for the amount of the transfer.

The first smart card may transmit transfer instructions that include sensitive transaction information directly to the secure payment gateway for processing. In some embodiments, the first smart transmit the card may sensitive transaction information to the payment gateway in a separate communication, distinct from transmission of transfer instructions. In some embodiments, the first smart card may transmit the sensitive transaction information to a first payment gateway and transmit the transfer instructions to a second payment gateway. A secure payment gateway may process the transfer instructions thereby reducing an exposure risk of the sensitive transaction information.

The secure payment gateway may provide the first smart card with confirmation that a transfer was completed. The confirmation may be displayed on the touch-sensitive screen. In some embodiments, the secure gateway may communicate with the second smart card. The secure gateway may provide the second smart card with confirmation that the transfer was completed.

In some embodiments, in addition to the confirmation, the user may be provided the option to enter additional information using touch-based selection of an option. The secure payment gateway may trigger the smart card to prompt for the additional information.

In some embodiments, the smart card may receive confirmation directly from a financial institution system. After successfully processing the transfer instructions, the secure payment gateway may push a notification to the financial institution system confirming successful execution of the transfer instructions.

In some embodiments, the second smart card may initiate a request to prompt the first card for a transfer. The second smart card may display a selectable option to request a transfer from the first smart card user. In response to selection of the option, a communication may be sent to the first smart card.

The smart card may include a biometric reader. The microprocessor may require submission of a valid biometric feature before attempting to establish a communication channel with the secure payment gateway. The microprocessor may require submission of a valid biometric feature before submitting the transfer instructions to the secure payment gateway.

In some embodiments, the microprocessor may require a touch-based confirmation from the user before transmitting transfer instructions to the secure payment gateway. The touch-based confirmation may include the screen displaying a confirmatory message and requiring the user to register confirmation by touching a target area of the screen.

In some embodiments, the smart card may include a fingerprint reader embedded within, or underneath the touch-sensitive screen. The user may register confirmation of transfer instructions by providing a fingerprint using the embedded fingerprint reader. The microprocessor may confirm whether the provided fingerprint matches a known fingerprint securely stored locally on the smart card. The microprocessor may display the target area associated with a confirmatory message overlaid above the embedded fingerprint reader. By pressing a finger against the target area, the user may register confirmation by touching a target area of the screen and simultaneously submit a fingerprint for verification.

A wireless communication interface of the smart card may include an inactive state. When in the inactive state, the wireless communication interface may be unable to connect to a communication channel transmit or data. The wireless communication interface may include an active state. In the active state, the wireless communication interface may be capable of connecting to a communication channel, receiving data or transmitting data. The microprocessor may toggle the wireless communication interface from the inactive state to the active state. The microprocessor may toggle the wireless communication interface from the active state to the inactive state.

For example, the microprocessor may detect that a valid PIN has been entered by the user of the smart card using the virtual keypad. In response to receiving the valid PIN, the microprocessor may toggle the wireless communication interface from the inactive to the active state. In response to receiving an invalid PIN, the microprocessor may maintain the wireless communication interface in the inactive state. In some embodiments, if the microprocessor detects a threshold number of invalid PIN entries, the microprocessor may lock the wireless communication interface.

The microprocessor may require a special code to unlock the wireless communication interface. The microprocessor may require that the smart card establish a wired connection to unlock the wireless communication interface. For example, the wireless communication interface may only be unlocked when the smart card is inserted into a card reader of an ATM. The smart card may also require entry of a valid PIN to access the ATM before unlocking the wireless communication interface.

The smart card may include a voice controller. The voice controller may generate an audio message confirming the interpretation of the touch inputs applied to the touch-sensitive screen. The microprocessor may prompt the user to touch a target area of the screen to confirm an accuracy of the generated audio message. In response to receiving the confirmation, the microprocessor may generate transfer instructions for executing the payment identified in the audio message.

In some embodiments, the audio message may itself specify one or more target authorization keystrokes. Illustrative target authorization keystrokes may include pressing two or more keys concurrently or a specified sequence of keys.

A system for enabling direct online transfers while improving the security of sensitive transaction information is provided. The system may include a smart card having a thickness not greater than 0.8 mm and a surface area not greater than 86 mm×54 mm. The smart card may include hardware components such as a communication interface and a microprocessor. The smart card may include a user input system in electronic communication with the microprocessor. The user input system may include a touch-sensitive screen and a display controller. The display controller may capture touch inputs entered using the touch-sensitive screen.

The smart card may include a touch-sensitive screen. The touch-sensitive screen may display a virtual keypad. The touch-sensitive screen may not expand the form factor of the smart card beyond 86 mm×54 mm×0.8 mm.

The smart card may include a wireless communication interface. The wireless communication interface may be configured to communicate using any suitable wireless communication protocol. Exemplary wireless communication protocols may include Wi-Fi, ZigBee, cellular and NFC.

The smart card may include a microprocessor. The microprocessor may be configured to control overall operation of the smart card and its associated components. The smart card may include executable instructions stored in a non-transitory memory. The executable instructions, when run by the microprocessor, may configure the microprocessor to take actions or control operation of one or more components of the smart card.

The executable instructions, when run by the microprocessor may formulate transfer instructions. The microprocessor may encrypt the transfer instructions. The microprocessor may formulate transfer instructions based on user input via the touch-sensitive screen.

The microprocessor may activate a wireless communication interface of the smart card. The wireless communication interface may include an NIC. The wireless communication interface may include an active NFC reader. The wireless communication interface may use the NFC reader to communicate with another smart card to determine credit strength. Using the wireless communication interface, the microprocessor may establish a communication link with a secure payment gateway. A network address of the payment gateway may be stored on the smart card. For example, the network address of a secure payment gateway may be stored in firmware of the smart card's NIC.

In other embodiments, the smart card may include a payment controller. The payment controller may determine a network address of a secure payment gateway based on a communication regarding a payment due. The payment controller may determine a network address of a secure payment gateway based on a user input via the touch-sensitive screen. The payment controller may resolve different inputs to different payment gateways.

The payment controller may determine an appropriate payment gateway based on the identity of a financial institution. For example, different financial institutions may be associated with different acquirer banks. Each of the acquirer banks may utilize different security or communication protocols. The payment controller may direct the smart card to a payment gateway that is compatible with the security or communication protocols utilized by a particular acquirer bank.

The payment controller may determine an appropriate payment gateway based on the amount of a transfer. For example, a payment gateway that requires higher level security and authentication may be utilized for larger transfers.

The executable instructions, when run by the microprocessor, may authenticate the smart card to the payment gateway over the secure communication channel. The microprocessor may transmit the encrypted transfer instructions to the payment gateway. The payment gateway may then process the transfer instructions received from the smart card.

Processing the transfer instructions may include debiting an account of the smart card user an amount corresponding to the transfer amount. After debiting a user account, the payment gateway may provide confirmation to the smart card.

By interacting with the payment gateway, the system insulates sensitive information from being exposed to potentially unsecure third-party systems. The user input may succinctly identify information needed to process a transfer. The user input may be securely entered directly into the smart card. The smart card then securely communicates with a secure payment gateway to process the transfer based on the information provided in the user input.

Methods for securing sensitive transaction information stored on a smart card are provided. Methods may include completing an online transfer without transmitting sensitive transaction information directly to a third-party computer system. A third-party system may be defined as any system that is not operated by an issuer of the smart card. Methods may include, using a touch-sensitive screen of the smart card, selecting a transfer option displayed on the touch-sensitive screen. Methods may include, using a virtual keypad of the smart card, entering a transfer amount.

Methods may include generating transfer instructions. The transfer instructions may integrate sensitive transaction information stored locally on the smart card. Methods may include determining a network address of a secure payment gateway. Using a wireless communication interface of the smart card, methods may include establishing a secure communication channel with the secure payment gateway.

Methods may include transmitting the transfer instructions to the secure payment gateway using the secure communication channel. The secure payment gateway may provide a secure interface, operated by an issuer of the smart card, for insulating the sensitive transaction information stored on the smart card from direct interaction with a third party-system.

Methods may include capturing transfer information using a touch-sensitive screen embedded in a smart card. The touch-sensitive screen may display payment options that may be selected by a user of the smart card. The user may touch one or more of the displayed transfer options.

The user may enter custom transfer options. For example, using touch inputs, the user may instruct the microprocessor to display a virtual keypad on the touch-sensitive screen. The user may touch displayed virtual keys to enter customized transfer details. The user may also use touch inputs to navigate menus displaying transfer options or other details that may be selected by the user. The user may use touch inputs to confirm or edit a transfer amount.

Based on the transfer options touched (e.g., selected) by the user, the microprocessor may formulate transfer instructions. Capturing the transfer information may include capturing touch inputs of a user applied to the touch-sensitive screen. Capturing the transfer information may include the microprocessor translating finger motions applied to the touch-sensitive screen into digital transfer instructions.

The smart card may include a payment controller. The payment controller may be configured to resolve selection of a transfer to a known secure system. The payment controller may determine whether the system meets security requirements set by the issuer of the smart card. The secure system may securely process the transfer instructions formulated by the smart card.

In some embodiments, before connecting to the secure system, the smart card may obtain approval for communicating with the secure system from an issuer bank. The smart card may use the wireless communication interface to request and receive approval to communicate with the secure system from the issuer.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes touch-sensitive screen 105. Touch-sensitive screen 105 may be used by a user of smart card 100 to select a transfer option or enter information. Exemplary information may include a PIN, a transfer amount, or acceptance of NFTs and scores received from another smart card.

Smart card 100 includes a microprocessor and other components for capturing, encrypting and storing information entered by a user. Smart card 100 may also include executable instructions for packaging information entered via touch-sensitive screen 105 into transfer instructions that may be executed by a secure payment gateway. The executable instructions may also formulate the transfer instructions based on sensitive transaction information stored on the smart card.

FIG. 1 shows that smart card 100 includes chip 101. Chip 101 may provide an electrical contact that is accessible through housing 102. Chip 101 may provide an electrical contact for establishing a wired or contact-based communication channel with an ATM or POS terminal when card 100 is inserted into a card reader of the ATM or POS terminal. Chip 101 may be an EMV chip.

Chip 101 may store a copy of information printed on a face of smart card 100. For example, chip 101 may store PAN 109, user name 115, expiration date 113 and issuing bank 111. Chip 101 may also store encrypted security information. The encrypted security information may be utilized to provide a "second factor" method of authentication prior to triggering execution of transfer instructions.

For example, smart card 100 may package information entered by user 115 via touch-sensitive screen 105 into transfer instructions. The transfer instructions may include a PIN associated with smart card 100. The transfer instructions may be submitted for execution to a payment gateway without requiring any further input from user 115.

After a payment gateway receives transfer instructions formulated by smart card 100, the payment gateway may first verify that the PIN included in the payment instructions is associated with smart card 100. For example, the payment gateway may communicate with a remote payment processing server operated by the issuer and determine whether the received PIN is associated with user name 115 and/or PAN 109.

As a second factor method of authentication, the payment gateway may determine whether the PIN included in the transfer instructions successfully unlocks encrypted security information stored on chip 101. If the PIN successfully unlocks the encrypted security information, the payment gateway may execute the received transfer instructions.

Smart card 100 may be any suitable size. FIG. 1 shows that smart card 100 has width w and length 1. For example, width w may be 53.98 millimeters ("mm"). Length 1 may be 85.60 mm. Smart card 100 has thickness t. An illustrative thickness t may be 0.8 mm. An exemplary form factor of smart card 100 may be 53.98 mm×85.60 mm×0.8 mm. Such an exemplary form factor may allow smart card 100 to conveniently fit into a user's wallet or pocket. This exemplary form factor may allow smart card 100 to fit into a card reader of an ATM or POS terminal.

Figure 2A:
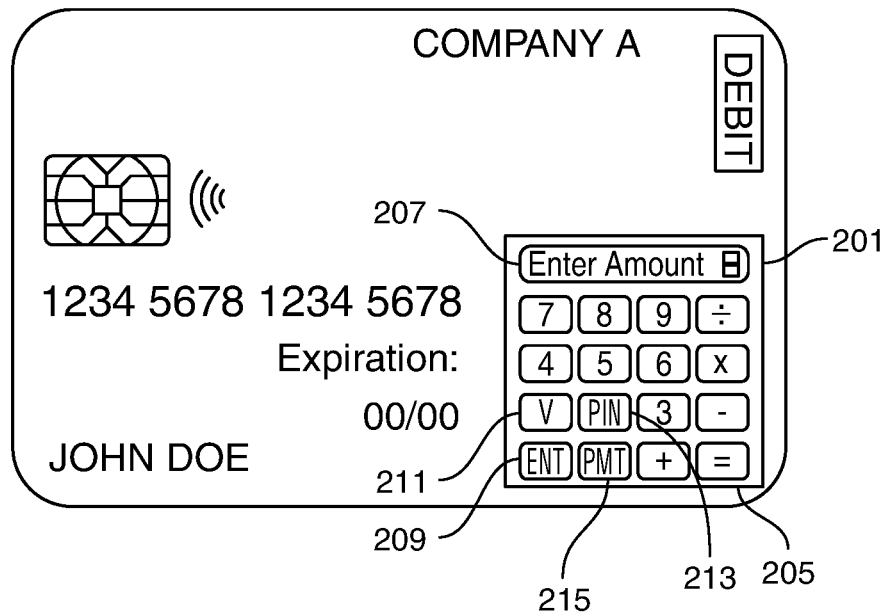
FIG. 2A shows illustrative apparatus in accordance with principles of the disclosure.

FIG. 2A shows illustrative smart card 200. Smart card 200 may include one or more features of smart card 100 (shown in FIG. 1). Smart card 200 includes touch-sensitive screen 205. Touch-sensitive screen 205 may include one or more features of touch-sensitive screen 105.

FIG. 2A shows screen 205 of smart card 200 displaying a virtual keypad. The virtual keypad includes display 207 for displaying information entered by a user. Virtual keypad display 207 may provide a user with visual prompts for entering information. FIG. 2A shows virtual keypad display 207 prompting for entry of a payment amount.

The virtual keypad displayed on touch-sensitive screen 205 shows illustrative keys that may be used to enter information. The virtual keypad includes enter key 209. A user may touch enter key 209 after entering a complete payment amount. Touching enter key 209 may trigger storage of the payment amount locally on smart card 200. Touching enter key 209 may trigger formulation of payment instructions based on the payment amount.

The virtual keypad includes payment key 215. The smart card user may touch payment key 215 to initiate a payment. Touching payment key 215 may activate a NIC of smart card 200. Once activated, the NIC may scan for an available secure communication channel.

In some embodiments, an initial touching of payment key 215 may cause virtual keypad display 207 to display a list of previously entered payments for different merchants. The user may scroll though the previously entered payments. The user may scroll through displayed entries using the "+" or "-" keys. The user may touch enter key 209 to select an entry.

Figure 2B:
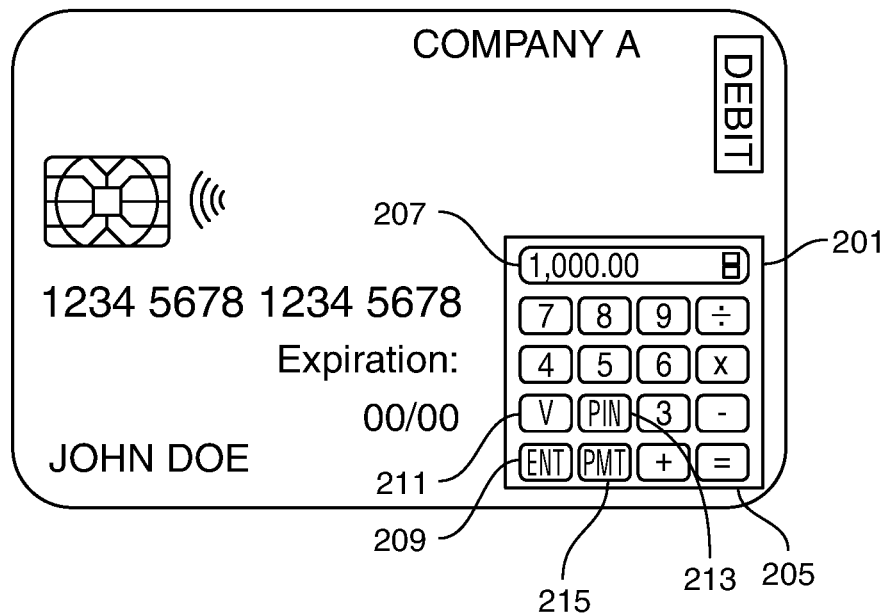
FIG. 2B shows illustrative apparatus in accordance with principles of the disclosure.

FIG. 2B shows virtual keypad display 207 of smart card 200 displaying a payment amount entered by a user. The user may confirm the entry by touching the enter button. After selecting the desired entry, the user may touch payment key 215 a second time to initiate transmission of the payment instructions formulated based on the payment amount to a payment gateway. When the payment gateway receives the transaction instructions, the payment gateway may initiate the payment defined in the payment instructions.

Before touching payment key 215 (e.g., a second time) to transmit the payment instructions, the user may first touch voice confirmation key 211. Touching voice confirmation key 211 may cause smart card 211 to generate an audio message. The audio message may confirm the merchant and amount associated with the payment. If the audio message is correct, the user may proceed to press payment key 215 and transmit the payment instructions to a payment gateway.

In some embodiments, smart card 200 may be configured to automatically produce a confirmatory audio message. In such embodiments, the user may be required to confirm the content of the audio message before smart card 200 transmits the transaction instructions. For example, the user may be required to touch enter key 209 or voice confirmation key 211 to confirm the content of the audio message. Smart card 200 may prevent transmission of the payment instructions (even if the user presses payment key 215) unless the audio message has been confirmed by the user.

In response to a prompt displayed on virtual keypad display 207, a user may enter a PIN. The user may confirm submission of the PIN by touching PIN key 213. The user may be prompted to enter a PIN to confirm that that the user is authorized to initiate a transaction using smart card 200. A microprocessor may toggle a wireless interface of smart card 200 from the inactive state to the active state in response to receiving a valid PIN entered using the virtual keypad.

Figure 3:
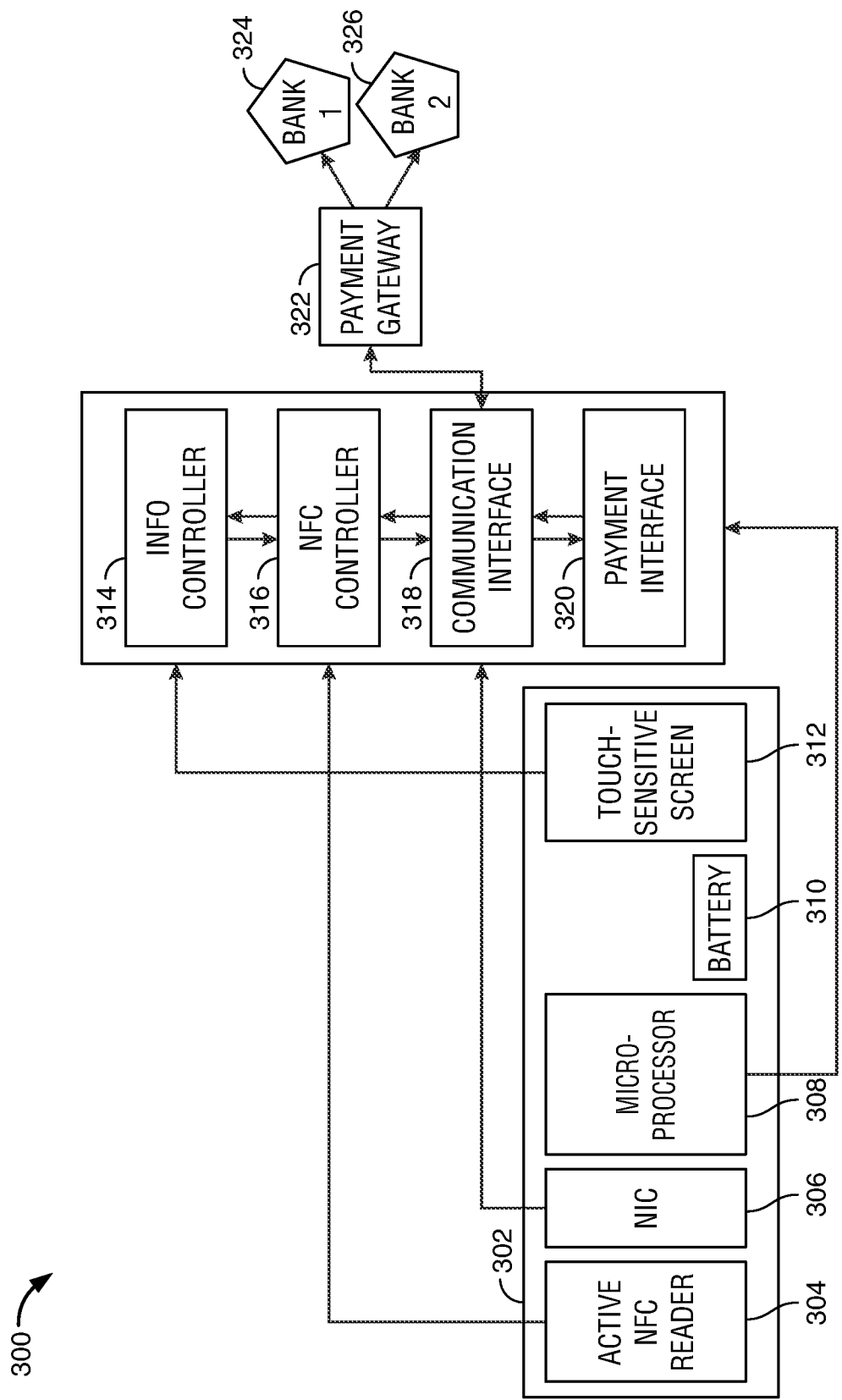
FIG. 3 shows illustrative system architecture in accordance with principles of the disclosure.

FIG. 3 shows illustrative system architecture 300. FIG. 3 shows components of smart card 302. Smart card 302 may include one or more features of smart cards 100 and/or 200.

Smart card 302 includes hardware components such as NFC reader 304, network interface card (NIC) 306, microprocessor 308, battery 310, and touch-sensitive screen 312.

Smart card 302 includes information controller 314. Information controller 314 may capture data entered using touch-sensitive screen 312. Information controller 314 may encrypt data captured by touch-sensitive screen 312. Illustrative encryption algorithms include RSA cryptography, Blowfish, AES, RC4, RC5, and RC6. Input controller 312 may store captured data locally on smart card 302.

Smart card 302 includes NFC controller 316. NFC controller 316 may use active NFC reader 304 to receive data from other smart cards. NFC controller 316 may receive instructions based on inputs captured by information controller 314. Information controller 314 may display NFTs or scores received from a financial institution or from other smart cards on touch-sensitive screen 312.

Smart card 302 includes payment interface 320. Payment interface 320 may determine a network address of a secure payment gateway. Payment interface 320 may resolve different inputs to different payment gateways.

Smart card 302 includes communication interface 318. Communication interface 318 may use NIC 306 to communicate with a payment gateway. Communication interface 318 may use NIC 306 to communicate with a financial institution to obtain NFTs and associated scores. Communication interface 318 may receive a payment gateway address from payment interface 320. Communication interface 318 may formulate communications based on information obtained by NFC controller 316. Communication interface 318 may formulate communications based on inputs obtained by information controller 314.

In some embodiments, communication interface 318 may include NFC controller 316. Communication interface 318 may use NIC 306 to communicate with payment gateway 322 and bank 324 and may use NFC Reader 304 to communicate directly with another smart card.

Smart card 302 includes microprocessor 308 which controls overall operation of smart card 302 and its associated components. Microprocessor 308 may control operation of information controller 314, NFC controller 316, communication interface 318, and payment interface 320.

Microprocessor 308 may formulate transfer instructions destined for bank 324. Bank 324 may be associated with a first account. The transaction instructions may be forwarded to bank 324 by payment gateway 322. In some embodiments, smart card 302 may be configured to communicate directly with bank 324. For example, bank 324 may request authentication, such as a PIN, before debiting an account associated with smart card 302 based on received payment instructions.

Microprocessor 308 may formulate transfer instructions destined for bank 326. Bank 326 may be associated with a second account. The transfer instructions may be forwarded to bank 326 by payment gateway 322. In some embodiments, smart card 302 may be configured to communicate directly with bank 326. For example, after a successful execution of transfer instructions by payment gateway 322, smart card 302 may receive confirmation from bank 326. In some embodiments the first account and the second account may be associated with the same bank.

Payment gateway 322 may perform one or more checks to verify transfer instructions received from parent smart card 302. For example, payment gateway 322 may prompt a user of parent smart card 302 to enter a PIN using a virtual keypad displayed on touch-sensitive screen 312.

After authenticating transfer instructions received from smart card 302, the payment gateway may submit the payment instructions for settlement.

Figure 4:
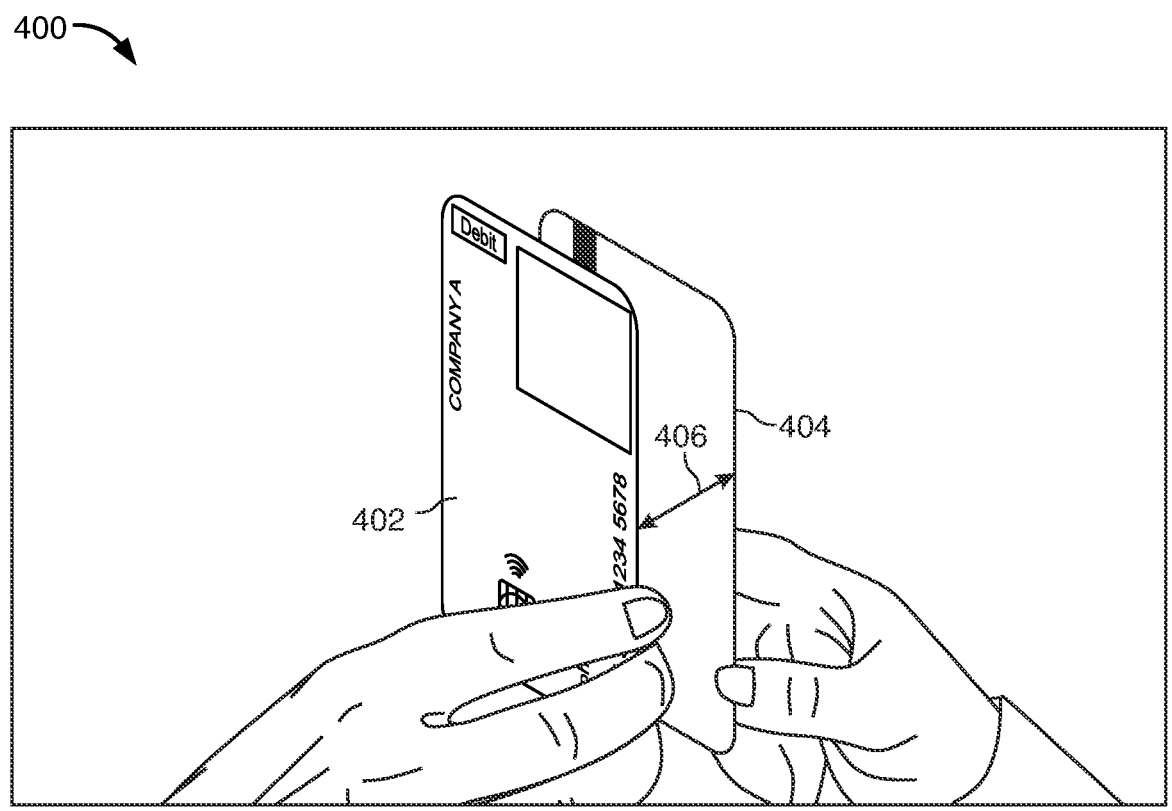
FIG. 4 shows an illustrative process in accordance with principles of the disclosure.

FIG. 4 shows illustrative process 400 for card-to-card direct communication. A first user may place the first smart card in a first position, as shown at 402. A second user may place the second smart card in a second position, as shown at 404. The two positions may be within a predetermined proximity of each other. In order to perform a transaction and enable two-way communication between the two cards, the distance between the two cards may be a distance ranging between zero and approximately 10 cm, as shown at 406. It should be appreciated that exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

Figure 5:
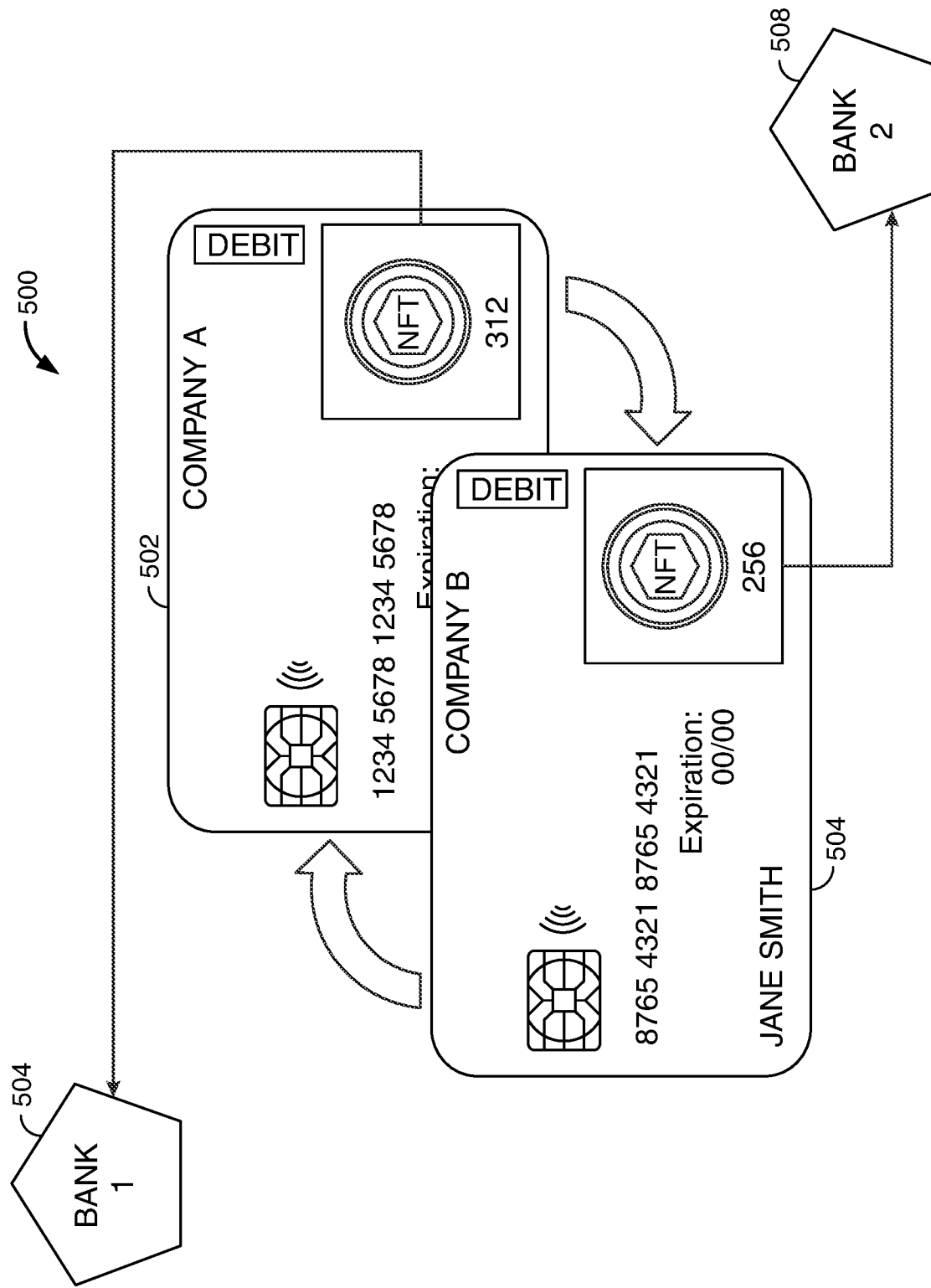
FIG. 5 shows an illustrative process in accordance with principles of the disclosure.

FIG. 5 shows illustrative process 500, for communication of credit strength between smart cards in preparation for a direct card-to-card transaction. The smart cards may communicate with each other using NFC. Each smart card may request an NFT for a prior transaction from a financial institution such as a smart card issuer. A smart card may communicate with the financial institution using an NIC.

Each smart card may display a retrieved NFT and an associated score on a smart card display. A first smart card may also communicate a representation of the NFT or number of NFTs to a second smart card for display on a second smart card.

The smart card may also display trust deficit NFTs. A trust deficit NFT may be associated with a failed transaction. Trust deficit NFTs may be differentiated using text, color, shading, design, or any suitable element of the representation.

Figure 6:
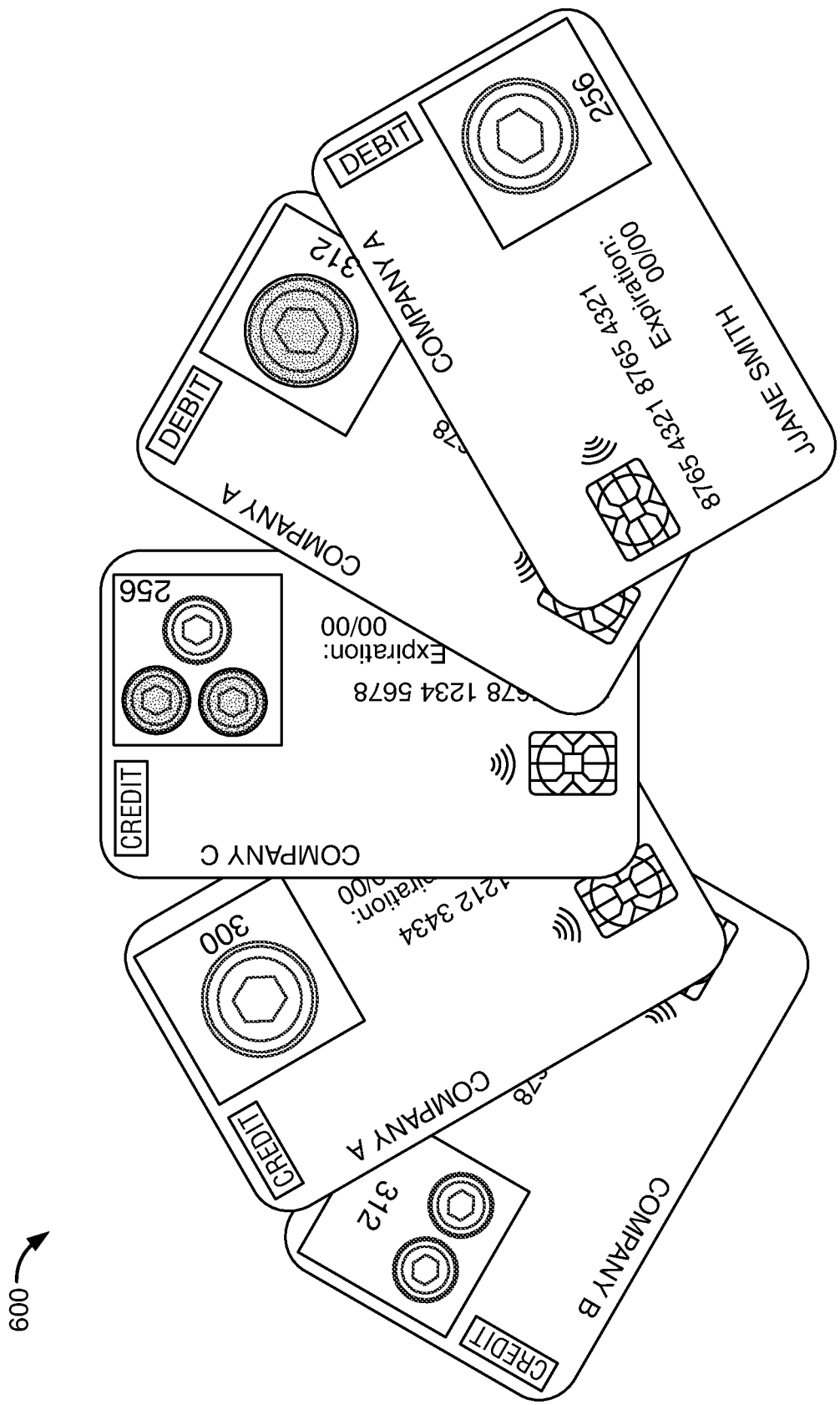
FIG. 6 shows an illustrative process in accordance with the principles of the disclosure.

FIG. 6 shows illustrative process 600 for communicating credit strength between smart cards in preparation for a direct card-to-card transaction.

In illustrative scenario 600, multiple smart cards are stacked to improve the credit status for a card user. Each smart card may obtain a number of NFTs and associated scores from a financial institution. A total number of NFTs and a combined score may be communicated to the smart card of a transaction partner.

Figure 7:
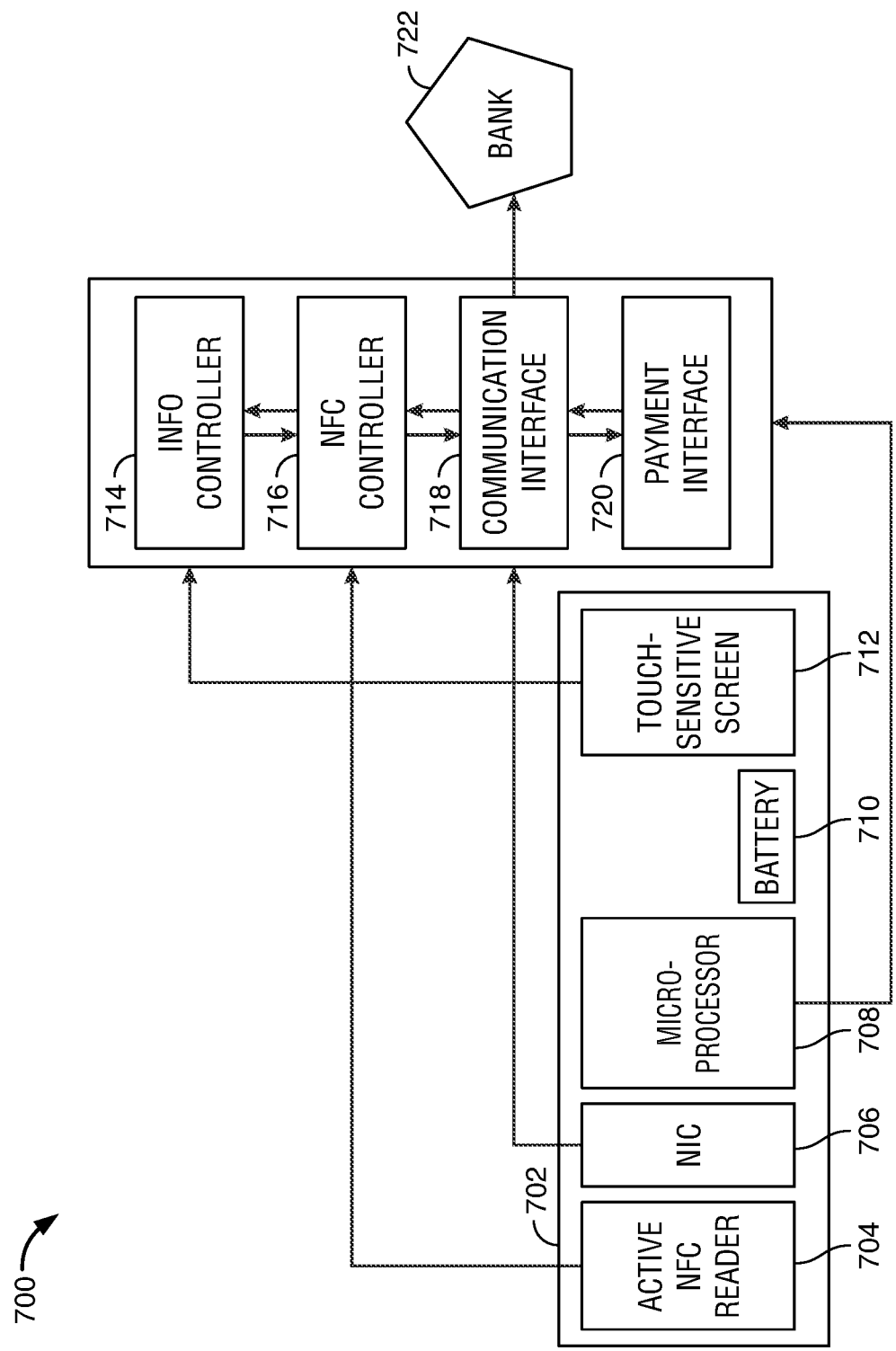
FIG. 7 shows illustrative system architecture in accordance with the principles of the disclosure.

FIG. 7 shows illustrative system architecture 700.

Elements of system architecture 700 may correspond to system architecture 300, shown in FIG. 3. In system architecture 700, communication interface 716 may use NIC 706 to communicate directly with bank 722. Bank 722 may generate an NFT from a prior transaction involving smart card 702. Bank 722 may transmit the NFT and an associated credit score to smart card 702.

Information controller 714 may display the NFT on touch-sensitive screen 712. Information controller 712 may receive an input approving the NFT and score on touch-sensitive screen 712.

NFC controller 716 may communicate the NFT and the associated score to another smart card using the active NFC reader. The other smart card may be positioned within a predetermined distance of smart card 702 as illustrated in process 400, shown in FIG. 4.

Figure 8:
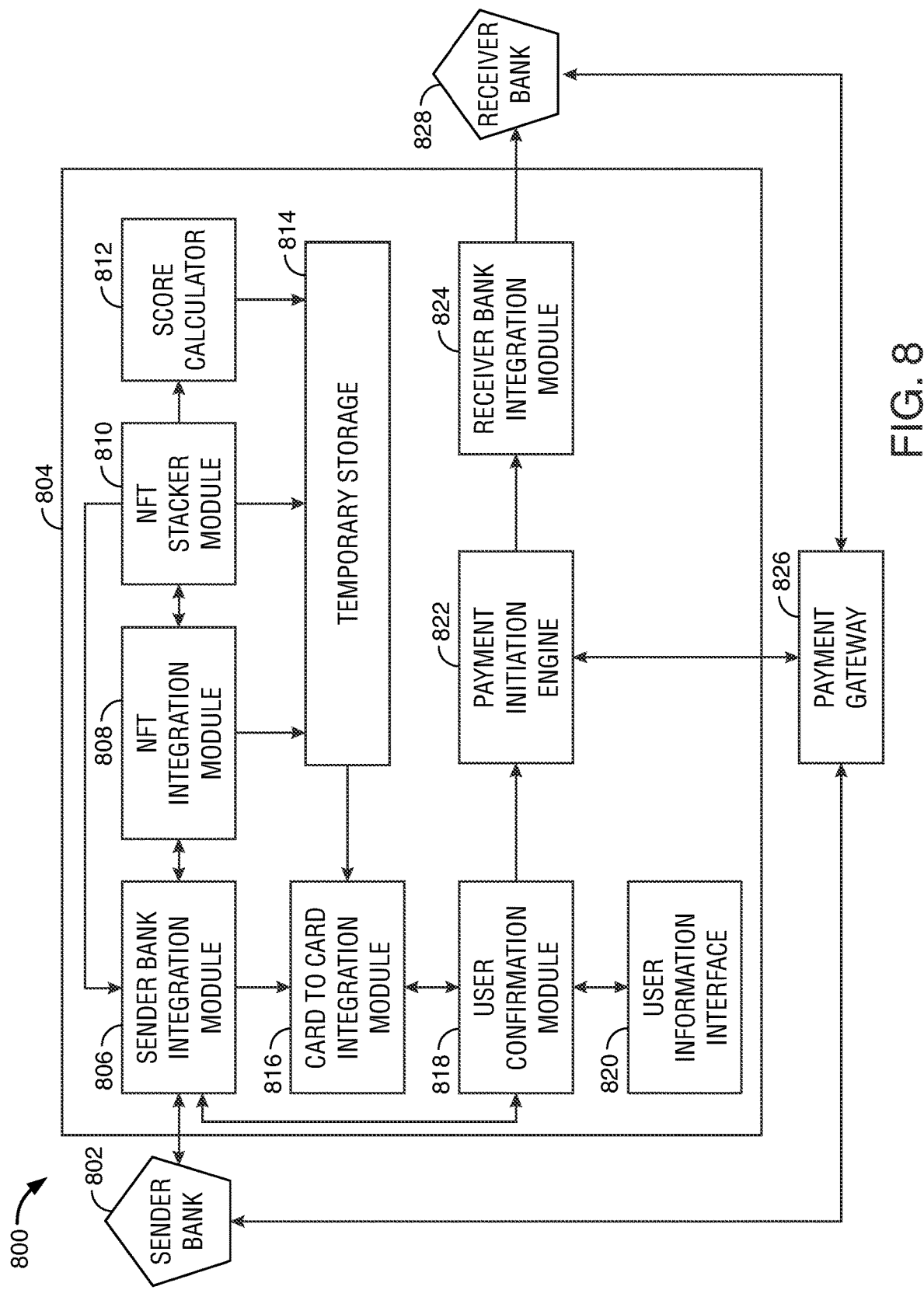
FIG. 8 shows illustrative system architecture in accordance with the principles of the disclosure.

FIG. 8 shows illustrative system architecture 800. FIG. 8 shows components of smart card 804. Smart card 804 may include one or more features of smart cards 100, 200, 302, and/or 702.

Smart card 804 may include sender bank integration module 806. Sender bank integration module 806 may control interactions with the sender bank 802. Sender bank integration module 806 may request an NFT from sender bank 802. The NFT may include transaction data from a past transaction involving smart card 804. NFT integration module 808 may control recognition of the NFT by smart card 804. NFT stacker module 810 may control recognition of NFTs from multiple stacked cards. Score calculator 812 may integrate the scores from multiple stacked cards. Modules 808, 810, and 812 may store NFTs and scores in temporary storage 814. In some cases, NFT stacker module 810 may communicate with sender bank integration module 806 to resolve any issues regarding recognition of the stacked cards.

Smart card 804 may include card-to-card interaction module 816. Card-to-card interaction module 816 may control NFC interactions with another smart card. Card-to-card interaction module 816 may transmit or receive a representation or number of NFTs and associated scores.

Smart card 804 may include user confirmation module 818. User confirmation module 818 may control the display and/or transmission of a user identifier. User information interface 820 may display the user identifier on a touch-sensitive screen. User confirmation module 818 may communicate with sender bank integration module 806 to obtain and/or confirm a user identifier at bank 802.

In response to authorization of the transaction by user confirmation module 818, payment initiation module 822 may initiate a transfer to a receiver smart card. Payment initiation module 822 may communicate with receiver bank integration module 824. Receiver bank integration module may communicate with receiver bank 828 regarding the transfer. Payment initiation module 822 may communicate with payment gateway 826 to resolve the transfer. Payment gateway 826 may communicate with a payment network to debit sender bank 802 and credit receiver bank 828.

Thus, methods and apparatus for CARD-TO-CARD DIRECT COMMUNICATION WITH NON-FUNGIBLE TOKEN (NFT) STACKING AND BARTER are provided. Persons skilled in the art will appreciate that the present invention can be practiced by other than the described embodiments, which are presented for purposes of illustration rather than of limitation, and that the present invention is limited only by the claims that follow.

What is claimed is:

1. A first smart payment card that enables a direct card-to-card transaction with a second smart payment card and improves security of sensitive transaction information, each smart payment card having a thickness that is not greater than 0.8 millimeters ("mm") and comprising:
a housing;
a wireless communication interface embedded in the housing;
an active near-field communication (NFC) reader embedded in the housing;
a microprocessor embedded in the housing;
a touch-sensitive screen that captures finger motions; and
executable instructions stored in a non-transitory memory, that when run by the microprocessor:
using the active NFC reader, initiate a communication with the second smart card;
using the wireless interface, receive from an issuer of the first smart card a first non-fungible token (NFT) comprising transaction data from a prior transaction, and a first score associated with the NFT;
using the NFC reader, transmit the first NFT and the first score to the second smart card and receive a second NFT and second score from the second smart card;
capture a touch-based selection of a transfer option, the selection based on the second NFT and the second score;
based on the captured selection, formulate a set of transaction instructions;
using the wireless interface, establish a direct communication channel with a secure payment gateway identified in the transaction instructions; and transmit the transaction instructions directly to the secure payment gateway for processing.

2. The smart payment card of claim 1, wherein initiating the communication comprises detecting the second active smart card positioned within a predetermined distance of the first smart card.

3. The smart payment card of claim 1, wherein the executable instructions when run by the microprocessor:
receive an identifier from the second smart card via NFC, the identifier comprising an NFC tag;
authenticate the identifier received from the second smart card.

4. The smart payment card of claim 1, wherein the executable instructions when run by the microprocessor:
using the active NFC reader, request an additional NFT and score from the second smart card;
using the touch-sensitive screen, display a number of NFTs and a combined score from the second smart card on the touch-sensitive screen.

5. The smart payment card of claim 1, wherein the executable instructions when run by the microprocessor:
detect a third smart payment card within a predetermined proximity to the first smart card and the second smart card;
using the active NFC reader, receive a third NFT and a third score from the third smart card; and
using the touch-sensitive screen, display a number of NFTs and a combined score from the second smart card and the third smart card.

6. The smart payment card of claim 1, wherein the card further comprises a payment controller configured to determine a network address of the secure payment gateway, the network address based at least in part on the captured selection.

7. The smart payment card of claim 1, wherein, in response to selection of a transfer option, the executable instructions when run by the microprocessor:
display a transfer amount using the touch-sensitive screen;
display a selectable option to confirm the transfer amount using the touch-sensitive screen; and
display a selectable option to edit the transfer amount using the touch-sensitive screen.

8. The smart payment card of claim 7, wherein the executable instructions when run by the microprocessor:
capture a touch-based selection of the option to edit a transfer amount;
display a virtual keypad using the touch sensitive screen;
capture an edited transfer amount via a touch-based input using the virtual keypad; and
formulate the transfer instructions based, at least in part, on the edited transfer amount.

9. The smart payment card of claim 1, wherein the executable instructions, when run by the microprocessor receive confirmation from the secure payment gateway via the wireless interface that the transfer instructions formulated by the smart card have been successfully executed.

10. The smart payment card of claim 1 wherein the smart payment card further comprises a biometric reader and the computer-executable instructions, when run by the microprocessor require capturing, using the biometric reader, a valid biometric feature before transmitting the transfer instructions to the secure payment gateway.

11. The smart payment card of claim 1, wherein the housing and the touch-sensitive screen collectively have a thickness that is not greater than 0.8 millimeters ("mm") and a surface area not greater than 86 mm×54 mm.

12. The smart payment card of claim 1, wherein:
the wireless interface comprises:
an inactive state in which the wireless interface is unable to transmit data; and
an active state in which the wireless interface is capable of transmitting data; and
the microprocessor toggles the wireless interface from the inactive state to the active state in response to receiving a valid personal identification number ("PIN") entered using a virtual keypad displayed on the touch-sensitive screen.

13. A method for a direct card-to-card transaction, while securing sensitive transaction information stored on a smart card, each smart card having a thickness that is not greater than 0.8 millimeters ("mm") and comprising a housing, a wireless communication interface embedded in the housing, a microprocessor embedded in the housing, and a touch sensitive screen, the wireless communication interface comprising an active near field communication (NFC) chip and a network interface card (NIC), the method comprising:
at a first smart card:
using the NFC chip, initiating an NFC communication with a second smart card in a predetermined proximity to the first smart card;
using the NIC, requesting from a first financial institution a first non-fungible token (NFT) comprising transaction data from a prior transaction, and a first score associated with the NFT;
using the NFC chip, transmitting the first NFT and the first score to a second smart card;
at the second smart card:
using the touch-sensitive screen, displaying the first NFT and the first score;
capturing a touch-based selection of a transfer option, the selection based at least in part on the first NFT and the first score;
based on the captured selection, formulating a set of transaction instructions;
using the NIC, establishing a direct communication channel with a secure payment gateway identified in the transaction instructions; and
transmitting the transaction instructions directly to the secure payment gateway for processing.

14. The method of claim 13, further comprising, at the second smart card:
using the NIC, requesting from a second financial institution a second non-fungible token (NFT) comprising transaction data from a prior transaction, and a second score associated with the second NFT;
using the NFC chip, transmitting the second NFT and the second score to the first smart card.

15. The method of claim 14, wherein transmitting an NFT comprises transmitting metadata associated with the NFT.

16. The method of claim 13, further comprising displaying the first NFT and the first score on the touch-sensitive screen of the first smart card.

17. The method of claim 13, wherein initiating the communication comprises detecting the second smart card positioned within a predetermined distance of the first smart card.

18. The method of claim 13, further comprising, at the second smart card:
using the NFC chip, receiving an identifier from the first smart card via NFC, the identifier comprising an NFC tag;
using the microprocessor, authenticating the first smart card identifier received from the second smart card.

19. The method of claim 13, further comprising, at the second smart card:
  using the NFC chip, requesting one or more additional NFTs and scores from the first smart card;
  using the touch-sensitive screen, displaying a number of NFTs and a combined score received from the first smart card on the touch-sensitive screen.

20. The method of claim 13, further comprising, at the second smart card:
  detecting a third smart payment card within a predetermined proximity to the first smart card and the second smart card;
  using the NFC chip, receiving a third NFT and a third score from the third smart card; and
  using the touch-sensitive screen, displaying a number of NFTs and a combined score from the first smart card and the third smart card.

21. The method of claim 13, each smart payment card further comprising a payment controller, the method further comprising, at the second smart card, using the payment controller, determining a network address of the secure payment gateway, the network address based at least in part on the captured selection.

22. The method of claim 13, further comprising, at the second smart card, receiving confirmation from the secure payment gateway via the wireless interface that the transfer instructions formulated by the second smart card have been successfully executed.

23. The method of claim 13, wherein the housing and the touch-sensitive screen collectively have a thickness that is not greater than 0.8 millimeters ("mm") and a surface area not greater than 86 mm×54 mm.

24. The method of claim 13, wherein the wireless interface comprises an inactive state in which the wireless interface is unable to transmit data and an active state in which the wireless interface is capable of transmitting data, the method further comprising toggling the wireless interface from the inactive state to the active state in response to receiving a valid personal identification number ("PIN") entered using a virtual keypad displayed on the touch-sensitive screen.

* * * * *